Aug. 5, 1952　　　B. W. THAMES　　　2,605,883
TURNING MACHINE

Filed Oct. 14, 1949　　　3 Sheets-Sheet 1

INVENTOR.
Bonnie Willard Thames
BY
Mason, Fenwick & Lawrence
ATTORNEYS

Aug. 5, 1952  B. W. THAMES  2,605,883
TURNING MACHINE
Filed Oct. 14, 1949  3 Sheets-Sheet 2
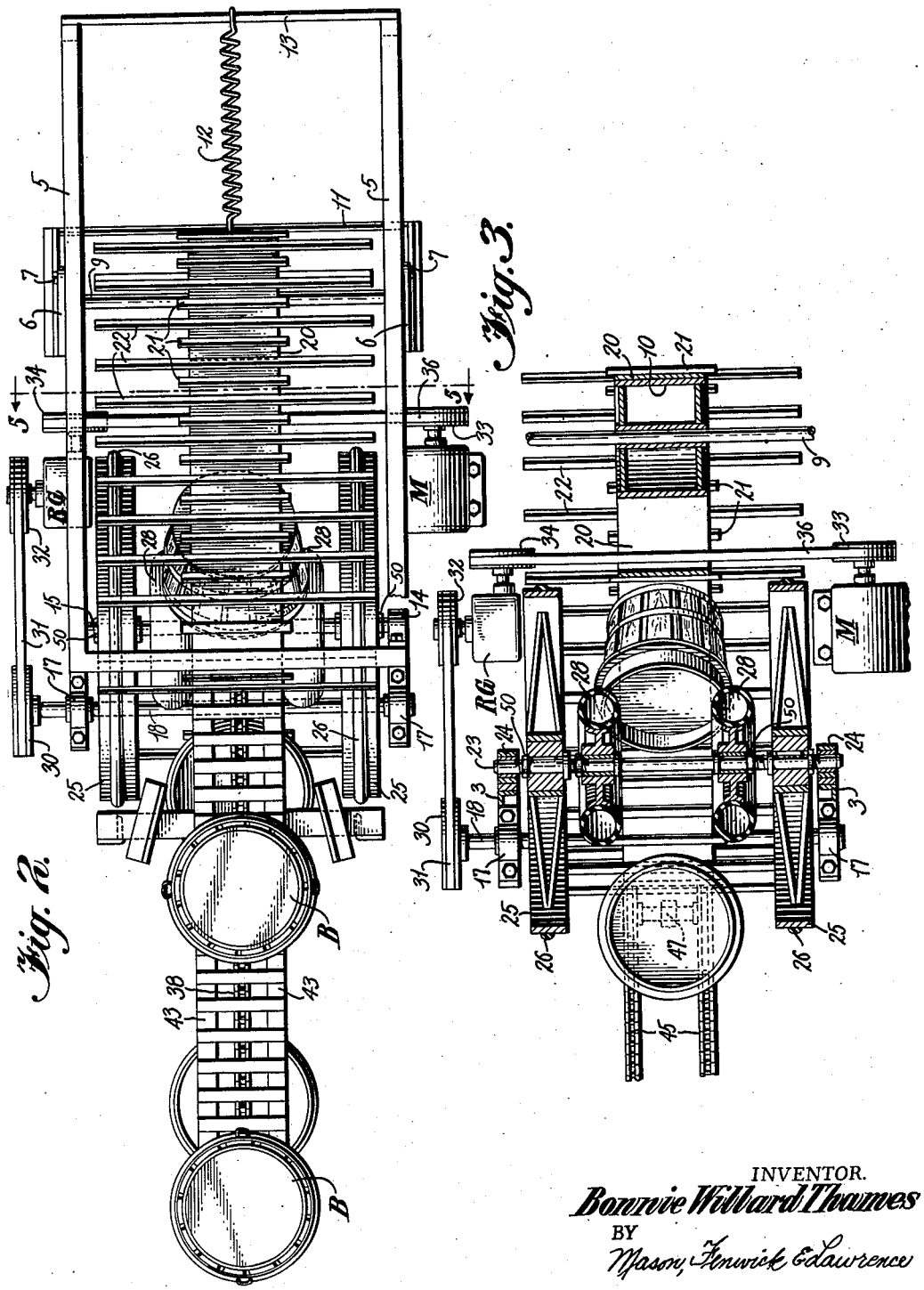
INVENTOR.
Bonnie Willard Thames
BY
Mason, Fenwick & Lawrence
ATTORNEYS

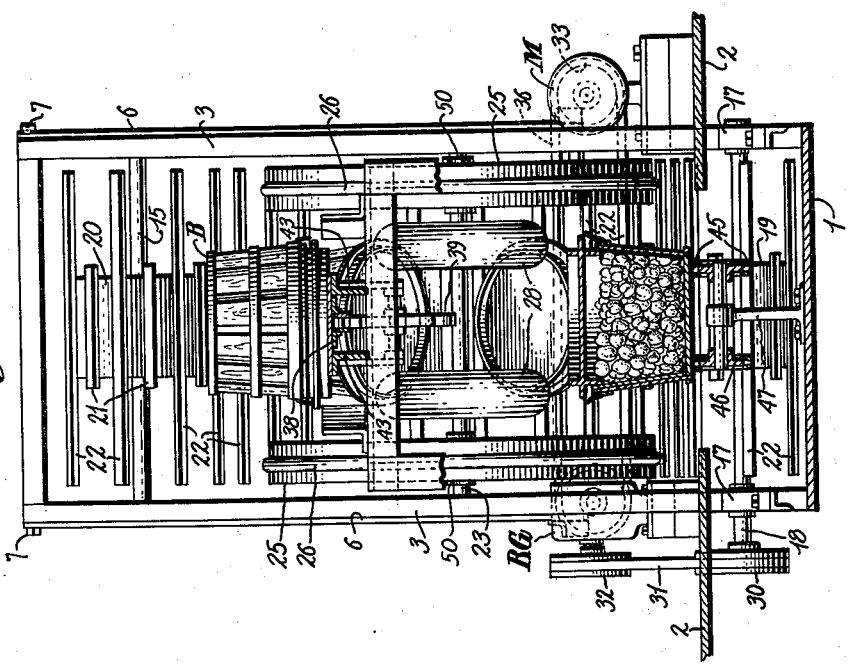

Patented Aug. 5, 1952

2,605,883

UNITED STATES PATENT OFFICE 2,605,883

TURNING MACHINE

Bonnie Willard Thames, Macon, Ga., assignor to Bateman Co., Inc., Macon, Ga., a corporation of Georgia Application October 14, 1949, Serial No. 121,350

8 Claims. (Cl. 198—33)

This invention relates to apparatus for use in connection with the packing of fruit and the like, and more particularly to a machine for inverting filled baskets in connection with the packing operation.

Modern merchandising of high quality fruit requires that the top layer of the basket be carefully laid so that upon removal of the top the fruit in the basket will present a neat and orderly arrangement of fruit.

To accomplish this it has been practice to lay what will be the top layer of fruit for a basket on a metal form known as a ringer, which is essentially a disk having an annular flange, and in some cases annular grooves for guidance in placing the fruit thereon. Over such a ringer a metal tub the same size as the basket, is placed inverted, this former having no bottom, and within the former a heavy paper liner is placed. Thereafter, the fruit is poured into this former upon the top of the carefully arranged bottom layer, and when the former is filled, the former is removed and the regular basket is inverted and placed over the paper liner, containing the fruit, the basket in that position being in inverted position.

It is at this point in the normal process of packaging fruit that the present machine is brought into operation.

The inverted baskets with the fruit within them and resting upon the metal ringer are carried by a conveyor into the machine in this inverted position and the machine automatically inverts the basket and ringer and delivers the same in its normally upright position upon a second conveyor which removes the filled baskets to a station where the metal ringer is removed and the regular basket top is applied.

The objects of the invention, therefore, are to provide an improved and simplified machine capable of receiving inverted baskets of fruit and completely inverting same so as to bring the initial bottom uppermost and the initial top bottommost, delivering the inverted baskets to a second conveyor for application of the regular basket tops.

A further object of the invention is to provide a machine of the character indicated which is adapted to adjustment for variations in the size of the basket.

A further object of the invention is to provide a machine of the character indicated which will not be unduly noisy in operation.

A further object of the invention is to provide a machine which will efficiently and effectively invert a series of inverted baskets in succession while maintaining the contents of the baskets securely therein.

Further objects will more particularly appear in the course of the following detailed description.

The invention consists in the novel construction, arrangement and combiiations of parts hereinafter more particularly described and claimed.

Three sheets of drawings accompany this specification as part thereof, in which like reference characters indicate like parts throughout.

In the drawings:

Figure 2 is a plan view of the machine;

Figure 3 is a horizontal cross section taken on line 3—3 of Figure 1;

Figure 4 is a vertical cross section taken on line 4—4 of Figure 1; and

Figure 5 is a vertical cross section taken on line 5—5 of Figure 2.

Figure 1:
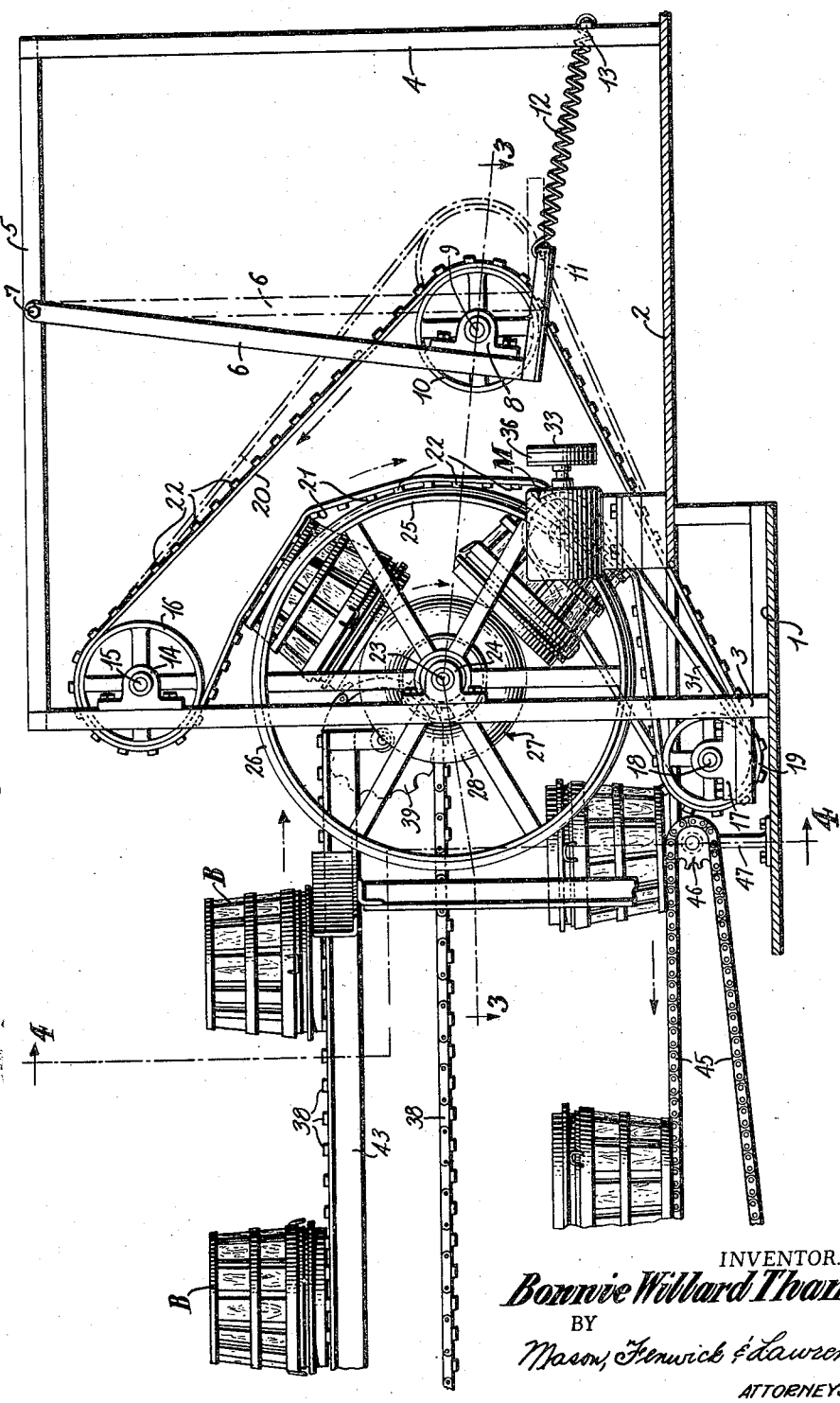
Figure 1 is a side elevation of a machine embodying the present invention.

Referring to the drawings which illustrate a practical embodiment of the invention, suitable framework is provided, herein illustrated as comprising horizontal base members 1 and 2, vertical standards 3 and 4, and horizontal cross standards 5—5, to provide supports for the necessary guide wheels arranged to support an endless conveyor 20 so as to provide a reach capable of assuming an arcuate form embracing an arc of substantially 180 degrees.

This arcuate reach of the endless conveyor 20 is normally guided and supported around portions of the peripheries of two guide wheels 25 which are freely mounted upon the shaft 23, the guide wheels 25 being spaced apart and between these guide wheels, and upon the same shaft 23 are freely rotatable two basket supporting wheels 27 which are conveniently fitted with pneumatic tires 28, these basket supporting wheels 27 being spaced apart sufficiently to engage and support the baskets delivered thereto. It will be apparent that by simple suitable mechanical connections, such as nuts 50, the conveyor guide wheels 25 and basket supporting wheels 27 can be adjusted axially of the shaft 23 to accommodate baskets of varying sizes as desired.

As herein illustrated, the shaft 23 is rotatable in journal brackets 24 secured to the forward vertical uprights 3.

The endless conveyor further passes over guide wheels 16 and 19, the former guide wheel mounted upon shaft 15 supported by journal brackets 14 near the top of the forward standard 3, and the guide wheel 19 being carried by shaft 18 mounted in journal brackets 17 carried by the base frame member 1.

A third guide wheel 10 is positioned within the conveyor 20 being mounted upon a shaft 9 carried by journal brackets 8 secured to a pivoted frame 6 pivoted as at 7 to the top frame member 5. The depending frame members 6 one on each side of the machine, are connected by a member 11 which is connected by a coil spring 12 to a transverse frame member 13 extending between the rear vertical frame members 4—4.

A motor M is mounted upon the base 2 and its drive wheel 33 carries a belt 36 which extends transversely of the framework and engages a driving pulley 34 associated with a standard reduction gear box R G the driven shaft of which carries a pulley 32 connected by belt 31 to a pulley 30 mounted upon the end of shaft 18, which also carries the lower guide wheel 19 for the endless conveyor.

A frame member 43 carries an endless feed conveyor 38 which passes over a sprocket 39 adjacent the guide wheels 25 so that the inverted baskets of fruit B are delivered by the upper reach of conveyor belt 38 with the ringer downmost and contacting the basket support wheel tires 28. As the basket seats itself upon the tires 28 the arcuate reach of conveyor 20 engages the bottom of the basket (which is uppermost), and the basket rotates with this arcuate portion of conveyor 20 until it is completely inverted into its normal upright position and delivered to a second endless conveyor 45 which passes over a sprocket wheel 46 carried by a supporting bracket 47 mounted on the base 1.

Preferably, conveyor guide wheels 25 are provided with peripheral flanges 26 of rubber or some other resilient material to deaden the noise of contact, and for convenience in adjustment the endless conveyor belt 20 has secured thereto a plurality of spaced transverse strips 21 and 22 arranged alternately, the strips 21 being of sufficient length to engage the bottoms of the baskets within the range contemplated for use with the machine, while the strips 22 are of sufficient length to extend beyond the endless conveyor 20 on both sides and engage the peripheral flanges 26 of the guide wheels 25.

Various modifications in the details of the arrangement both of the framework and of the guide wheels, will readily suggest themselves to those skilled in the art, but within the scope of the present invention as claimed.

Having thus described the invention, I claim:

1. Machine for inverting filled baskets comprising, a shaft, spaced conveyor supporting wheels on said shaft, spaced basket supporting wheel positioned between the conveyor supporting wheels on said shaft, an endless conveyor, a driving sprocket and plurality of guiding sprockets arranged to carry the conveyor with one reach guided by the conveyor supporting wheels throughout an arc of substantially 180°, means for tensioning the conveyor, means for feeding inverted baskets between the rotary supporting wheels and said reach of the conveyor in the direction of rotation of said reach and means for removing the baskets at the end of said reach.

2. Machine for inverting filled baskets comprising, supporting wheels for an endless conveyor, including a driven wheel, said wheels arranged to engage the inner face of said conveyor, spaced rotary basket supporting wheels, spaced conveyor guiding wheels mounted concentric with the basket supporting wheels, one on each side thereof, an endless conveyor having one reach arranged to have its exterior face guided by said conveyor guiding wheels through an arc of substantially 180°, means for tensioning said conveyor, independent conveyor means arranged to feed baskets between the basket supporting wheels and the outer face of said conveyor at one end of said arcuate reach, and independent conveyor means to receive the baskets at the other end of said arcuate reach.

3. Machine as specified in claim 2 in which the endless conveyor is formed with spaced transversely positioned slats secured thereto of a length to span the basket supporting wheels and engage the rims of the conveyor guiding wheels.

4. Machine as specified in claim 2 in which the endless conveyor is provided with spaced transversely positioned slats, and slats alternately of lengths to span the spaced basket supporting wheels and the spaced conveyor guiding wheels.

5. Machine as specified in claim 2 in which the spaced basket supporting wheels have elastic tires.

6. Machine as specified in claim 2 in which the spaced conveyor guiding wheels have elastic peripheral flanges against which the endless conveyor elements contact.

7. Machine for inverting filled baskets comprising, two spaced conveyors superposed and arranged to deliver baskets toward and remove baskets from a shaft arranged transversely thereof, spaced basket supporting wheels freely rotatable on said shaft in alignment with said conveyor, guide wheels freely rotatable on said shaft, said guide wheels each of a radius greater than that of the basket supporting wheels substantially the height of a basket, an endless conveyor having transverse spaced slats secured thereto, said slats of a length to span said guide wheels, guide wheels for said endless conveyor arranged to form a reach of said conveyor concentric with said guide wheels through an arc of substantially 180°, means for tensioning said endless conveyor and means for driving said endless conveyor.

8. Machine for inverting filled baskets and the like comprising, rotatable means for supporting and engaging the lower end of a basket as presented, an endless conveyor arranged to provide a reach concentric with said rotatable means through 180°, means for radially spacing said reach from said rotatable supporting means by substantially the depth of the baskets to be inverted, said rotatable means having a readily deformable rim portion to contact the basket, and means for yieldingly tensioning the conveyor member to apply pressure through said reach surrounding the rotatable means to the basket.

BONNIE WILLARD THAMES.

REFERENCES CITED

The following references are of record in the file of this patent:

UNITED STATES PATENTS

| Number | Name | Date |
| --- | --- | --- |
| 1,210,096 | Parker | Dec. 26, 1916 |
| 1,355,091 | Davies | Oct. 5, 1920 |
| 1,385,000 | Griffing | July 19, 1921 |
| 2,433,035 | Ersted | Dec. 23, 1947 |